United States Patent [19]

Bush et al.

[11] Patent Number: 5,516,819
[45] Date of Patent: May 14, 1996

[54] POLYMER COMPOSITIONS

[75] Inventors: Stephen F. Bush, Poynton; James M. Methven, Moreton; David R. Blackburn, Burnale, all of England

[73] Assignee: The University of Manchester Institute of Science and Technology, Manchester, England

[21] Appl. No.: 295,610

[22] Filed: Aug. 25, 1994

Related U.S. Application Data

[63] Continuation-in-part of Ser. No. 61,823, May 13, 1993, abandoned, which is a continuation of Ser. No. 542,727, Jun. 22, 1990, abandoned.

[30] Foreign Application Priority Data

Dec. 23, 1988 [GB] United Kingdom ............... 01148/88

[51] Int. Cl.$^6$ .................... C08L 67/06; C08L 75/16
[52] U.S. Cl. .................... 523/508; 524/227; 523/527; 525/28; 525/43; 525/49; 525/454; 525/455
[58] Field of Search .................. 525/43, 49, 440, 525/28; 524/227; 523/508

[56] References Cited

U.S. PATENT DOCUMENTS 3,994,853  11/1976  Hindersinn et al. .............. 260/40
4,895,895   1/1990  Osborne et al. ................. 525/28

FOREIGN PATENT DOCUMENTS 0083837  7/1983  European Pat. Off. .
1279387  6/1972  United Kingdom .
1370138  10/1974  United Kingdom .
1445926  8/1976  United Kingdom .

OTHER PUBLICATIONS

38–Plastics Fabr. Uses, vol. 108, 1988, p. 57.
S. F. Bush, J. M. Methven & D. R. Blackburn, "Networks as the Basis of Pre–Thickening SMG," Biological and Synthetic Polymer Networks, pp. 321–334 (1988).

*Primary Examiner*—Patricia A. Short
*Attorney, Agent, or Firm*—Pravel, Hewitt, Kimball & Krieger

[57] ABSTRACT

A method of producing a thickened organic polymeric composition useful for molding and capable of resisting post-molding shrinkage after being crosslinked comprising a cross-linkable base resin dissolved in an unsaturated monomer, and an additive resin selected from saturated polyesters and saturated amide waxes, the additive resin being crystalline at ambient temperatures and having a melting point ($T_m$) below a temperature ($T_c$) at which the base resin cross-linking reaction proceeds at a significant rate. The base resin and additive resin have only a partial degree of compatibility. When cooled from a temperature between $T_m$ and $T_c$ to temperature between $T_m$ and ambient the composition thickens, whereas, when it is heated to a temperature below $T_c$, it reverts to a flowable composition.

23 Claims, 1 Drawing Sheet

POLYMER COMPOSITIONS

RELATED APPLICATION

This application is a continuation-in-part of U.S. Ser. No. 08/061,823, filed May 13, 1993, which is a continuation of U.S. Ser. No. 07/542,727 filed Jun. 22, 1990 (both abandoned).

BACKGROUND OF THE INVENTION

The present invention relates to thickened cross-linkable polymer compositions which are useful in moulding applications. The invention relates particularly but by no means exclusively to such compositions which are useful for the formulation of sheet moulding compounds, (SMC) and granular moulding compounds (GMC).

SMC is used for a number of applications and generally comprises a leather-like sheet of a cross-linkable polymer composition (also including fillers, chopped glass fibres and other ingredients as necessary) which may be relatively stiff or drapeable to fit a particular mould. The material is then subjected to compression and heating to produce the moulded article. Usually, the base polymer of the composition is an unsaturated polyester with free-COOH groups.

The fundamental requirements for any SMC, of which a typical formulation is shown in Table I below, are:

(1) It must be handleable (i.e. relatively unsticky-tack-free at room temperature so that it can be easily cut to the requirements of a particular mould.

(2) Under prescribed pressures and temperature of moulding all the constituents of the sheet must flow to fill the mould uniformly with no segregation of the components shown in Table 1.

(3) After flowing to the edges of the mould at the prescribed temperatures, the unsaturated resin component must cross-link to give it a permanent form. It should be noted that in the formulation of Table I the unsaturated polyesters cross-link through the styrene present.

TABLE I

GENERAL PURPOSE SMC FORMULATION

| Ingredients | Composition/ % by weight |
| --- | --- |
| *UNSATURATED POLYESTER DISSOLVED IN STYRENE MONOMER | 25 |
| *SHRINKAGE CONTROL ADDITIVE | 5 |
| *CATALYST | 0.3–0.5 |
| *PILLERS (e.g. chalk) | 40–50 |
| *RELEASE AGENT | 0.4–0.5 |
| THICKENING AGENT | 0.2–0.4 |
| GLASS (25 mm) | 25 |

Ingredients marked * are first mixed together in a high shear mixer

The formulation shown in Table I has an initial viscosity (measured at ambient temperature without the glass reinforcement) of around 200 poise (20 Pa s), while in order to achieve (1) above, industry practice suggests a requirement of around 10000 poise (1 kPa s measured under the same conditions). This viscosity is however too high to permit (2). Thus,, in order to achieve both (1) and (2), two distinct steps are required:

(i) The unsaturated resin must be thickened at room temperature to obtain the desired viscosity for handling.

(ii) The viscosity must decrease sharply after placement in the mould to facilitate flow when pressure is applied.

The first step is known as "prethickening" of an SMC, and is based conventionally on the chemical reaction of residual carboxylic acid groups in the unsaturated polyester resin with oxides and hydroxides of Group II metals (typically Magnesium oxide MgO).

The manufacture of an SMC based on the composition shown in Table I consists of four basic steps:

(a) High shear mixing of the particulate fillers and the metal oxides and hydroxides into the resins.

(b) Spreading the glass fibres which are chopped in situ from rovings on to the resultant paste in the form of a sheet moving on a conveyor.

(c) Consolidation of and removal of adventitious air from the resulting fibre reinforced resin sheet; and (d) Allowing the viscosity of the sheet to increase through slow continuation of the prethickening reaction prior to moulding.

Typically the sheet is stored for some days to allow this maturation to take place. Generally, the sheet reaches the required viscosity after about two days after commencement of the prethickening.

The effect of the chemical reaction is to create a labile network by cross-linking the polyester chains via complex metal salts. The extent of this reaction is dependent upon the level of carboxylic acid groups in the resin and this must be carefully monitored for consistent prethickening behaviour. In practice it is also found that the rate of increase and final extent of viscosity are influenced by both the particle size of the prethickening agent and the level of water in the resin. The increase in viscosity during the mixing stage (a) must not be so great that in stage (b) the fibres are insufficiently wetted by the resin. At the same time conditions and concentrations must be such that maturation is achieved in a reasonable time as indicated above.

A disadvantage of the standard thickening process referred to is that it is not readily reversible. If the prethickened paste is not added sufficiently quickly to the glass fibres in step (b) above, it may be too thick to wet these fibres sufficiently and the whole batch will be lost.

During the moulding of a SMC, the unsaturated monomer reacts in the presence of a catalyst with itself and with the unsaturated bonds of the polymer to form a permanent, covalent network in which the polymer chains are linked through bridges of a few monomer units long. Generally this cross-linking must be effected at a temperature above 100° C. to break down the bonds formed between the Group II metals and the polyester resin.

During this permanent cross-linking reaction the resin shrinks in volume by up to 10%, and unchecked this would not only reduce the fidelity with which the moulding compound reproduced the mould dimensions, but would also render the surface of the moulding compound unattractive by highlighting the presence of the reinforcing fibres.

Hitherto, control of moulding shrinkage polyester-styrene SMCs has had to be effected by adding a solution of a thermoplastic in styrene to the SMC formulation. The solution commonly contains around 30% by weight of the thermoplastic. Appropriate thermoplastics include polystyrene, polyvinyl acetate, polycaprolactone, polymethyl methacrylate, and more recently, certain polybutadienes. Typically, the ratio of unsaturated polyester resin to the solution of thermoplastic is between 90:10 and 60:40 by weight.

An alternative to the use of Group II metal oxides or hydroxides for pre-thickening an SMC formulation is disclosed in GB-A-2111513 (Scott Bader) wherein a crystalline polyester is used as the sole thickening agent. The use of such a polyester has the advantage that no maturation is required and the formulations are ready for use as soon as they have cooled. According to GB-A-2111513 it is preferred that the crystalline polyesters are unsaturated so that they may also take part in the cross-linking reaction with the vinyl monomer (e.g. stryene) during curing. Moreover, it is also preferred that (for ease of handling) the crystalline polyesters are disolved in an aromatic vinyl monomer (e.g. styrene) before being incorporated into the SMC formulation, in which case this monomer also takes part in the cross-linking reaction.

Although the crystalline polyesters disclosed in GB-A-2111531 overcome the need for a long maturation period, it is still necessary to add a thermoplastic resin to reduce or prevent shrinkage during moulding. Furthermore dissolution of the crystalline polyester in an aromatic vinyl monomer represents an additional stage in the process and, moreover, its participation in the cross-linking reaction may undesirably increase the length of the monomer bridges between the polymer chains.

It is an object of the invention to obviate or mitigate the abovementioned disadvantages.

Summary of the Invention

According to a first aspect of the present invention there is provided a polymer composition comprising a cross-linkable base resin, an unsaturated monomer in which the base resin is dissolved and a saturated additive resin which by itself is crystalline at ambient temperatures with a melting point (Tm) below that temperature (Tc) at which the base resin cross-linking reaction is designed to proceed at a significant rate and which additive resin has only a partial degree of compatibility with the base resin, said composition being such that on cooling from a temperature between Tm and Tc, to a temperature between Tm and ambient the additive resin forms distributed microcrystalline domains connected severally by chains of the additive resin threading through the base resin chains, thereby producing a thickening network which may be reversibly broken down to the original additive resin molecules by heating to a temperature below Tc and which additive resin molecules swell the permanent base resin network created by the said cross-linking reactions during moulding shrinkage.

According to a further aspect of the present invention there is provided an method of producing a thickened resin composition comprising heating a saturated additive resin to a temperature above its melting point (Tm), and blending the fused resin with a mixture of an unsaturated base resin and an unsaturated monomer, said mixture being at a temperature above Tm but below the temperature (Tc) at which the base resin cross-linking reaction proceeds at a significant rate, and cooling the blend to a temperature below Tm, said addition resin being such that upon cooling of the blend below Tm it forms microcrystalline domains connected severally by chains of the additive resin threading through the base resin chains so as to form a thickening network which may be reversibly broken down to the original additive resin molecules by heating to a temperature below Tc and which, is such that during cross-linking of the base resin the additive resin swells the base resin network created by the cross-linking reactions thereby providing resistance to moulding shrinkage.

The invention also provides a method of producing a moulded article in which the composition in accordance with the first aspect of the invention is heated to effect cross-linking of the base resin.

Thus the invention provides polymer compositions, and methods for their manufacture, which incorporate a saturated additive resin serving the dual function of thickening the polymer composition and preventing (or reducing) moulding shrinkage without the need for additional anti-shrinkage additives. The polymer formulations of the invention may comprise reinforcement and thus are particularly useful in the formulation of sheet moulding compounds. However, the compositions will also be useful in other moulding applications where pre-thickening and anti-shrinkage properties are required. One example is injection moulding where the compositions of the invention will (by virtue of their anti-shrinkage properties) avoid the need to use high pressures for preventing the moulded article coming away from the mould. A further example is in a pultrusion technique for preparing granular moulding compounds (GMC) in which continuous fibres may be pulled through a die and coated with the polymer composition which, because it is thickened, does not drip off the fibres. The pultrudate or lace thereby made may be cut into granules, stored, and then subsequently injected or transferred to a mould where the cross-linking reaction occurs to form a moulded artefact.

The compositions of the invention may also be used as Dough Moulding Compounds.

BRIEF DESCRIPTION OF THE DRAWINGS

The invention will be further described with reference to the accompanying drawings in which.

DETAILED DESCRIPTION OF THE PREFERRED EMBODIMENTS

For the thickening effect to occur, the base and additive resins must have only a partial degree of compatibility so that on the one hand they do not form a true solution and on the other hand they are not so incompatible that near-complete segregation of the two resins occurs. Preferably the semi-compatibility corresponds to a solubility parameter difference ($\Delta\delta$) lying in the range 0.5 to 3.5 in $MPa^{1/2}$ units for resin pairs where there is no specific hydrogen bonding between the resins. More preferably still for optimum behaviour the range($\Delta\delta$) should be 1.0 to 2.5.

The solubility parameter ($\delta$) for a polymer may be determined by a calculation based on a group contribution method, such as the one devised by Small (P. A. Small, Some Factors Affecting the Solubility of Polymers. Journal of Applied Chemistry, 3 p61, 1953). By summing the values of "molar attraction constants" ($F_2$) for various parts of the polymer chains, a value for the solubility parameter ($\delta$) of the molecule can be estimated.

Values of $F_i$ can be found from Tables and are related to the solubility parameter by equation (1).

$$\delta = \frac{\Sigma F_i}{\Sigma V_i} \quad (1)$$

where $V = \epsilon V_i$ is the total volume of the polymer and Vi is the volume contribution of each group.

The values of group contribution reported by different authors vary (D. W. Van Krevelen & P. J. Hoftyzer, Properties of Polymers, 2nd. Ed.Ch.8, Elsevier, Amsterdam, 1976) and it is therefore essential to use a self-consistent set of values when comparing different materials.

Figure 1:
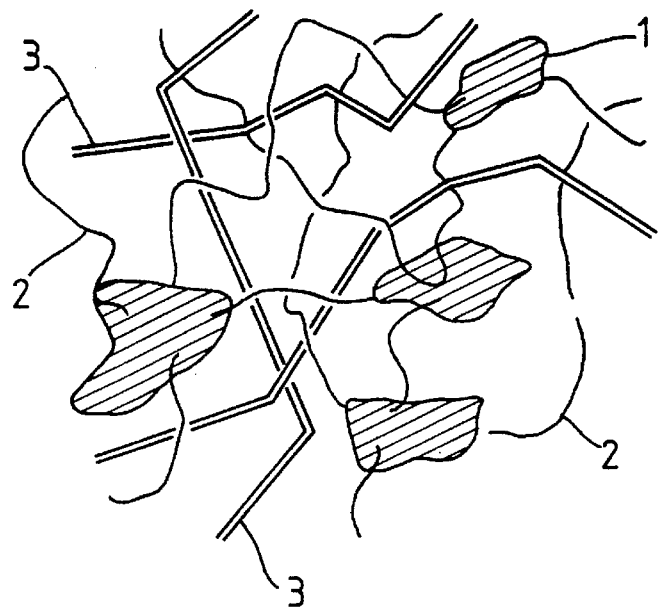
FIG. 1 is a representation of the molecular structure of the thickened resin composition.

In a situation where the base resin comprises an arrangement of different functional groups, the base resin solubility parameter may be taken to be a weighted average of those provided by the individual functional groups and the additive resin selected accordingly. However, where the base resin contains blocks of different functional groups which constitute a substantial proportion of the average oligomer chain length the invention provides for the use of several additive resins each corresponding to each long block type of the base resin.

Where the base resin contains groups likely to enter into specific interactions with an additive resin, the solubility parameter criterion may be generalised to one of requiring a partial compatibility between the base and additive resins equivalent to that defined by the solubility parameter range ($\Delta\delta$) defined for non-specific interactions. The requirement for partial compatibility as typified by the solubility parameter difference ensures that on cooling from temperatures above Tm (the additive crystalline melting point), the crystallisation process of the additive resin which would begin to occur at Tm is hindered and constrained by the presence of the molecular chains of the base resin, so that (as shown in FIG. 1), the additive resin crystallises (i) only partially, and (ii) in the form of distributed crystallite domains 1 linked by chains 2 of the additive resin not in the crystallites, which chains are threaded by the chains of the base resin 3. The temperatures at which such crystallites are mainly formed are found to lie between ambient temperature and Tm, typically 8°–15° C. below Tm.

The degree of thickening of the base resin thereby achieved depends on (a) the proportion of additive resin used, (b) the extent of incompatibility, (c) the speed of cooling composition from above Tm. Generally increases (a) and (b) increase the thickening achieved by increasing the long term crystallinity up to the limit where significant segregation of the two resins in the composition is obtained. Generally increases in cooling rate may be expected to decrease the short-term thickening with only a minor effect on the long-term crystallinity obtained. This allows more efficient wetting of any reinforcing fibres present without affecting the longer term handleability of the thickened composition. As already indicated the network-forming process is reversible by heating to a temperature somewhat above that at which the crystallite nodes of the network were formed on cooling and this provides still further control over the process not present in conventionally thickened compositions.

Figure 2:
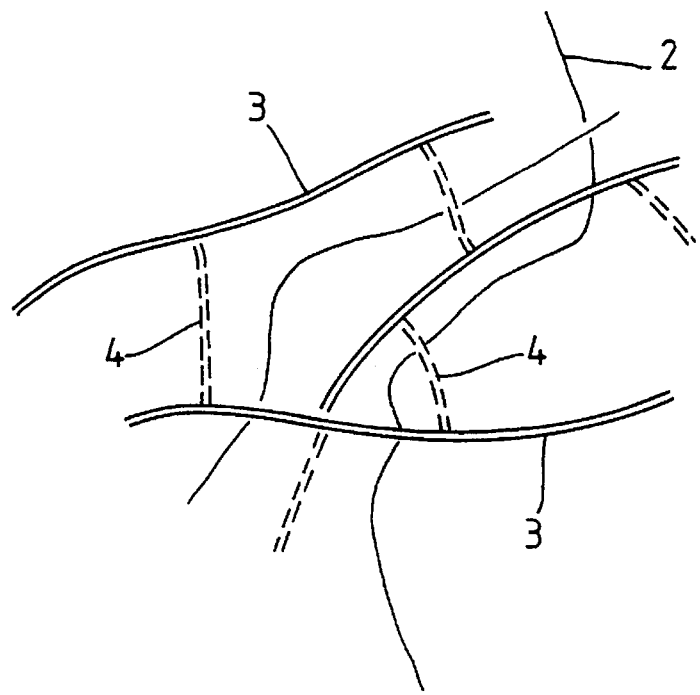
FIG. 2 is a representation of the molecular structure of the cross-linked composition.

The invention provides an important advantage at the stage where the thickened composition is moulded into a final artefact, that is when after compression and heating in a shaping die or mould to the base resin cross-linking temperature Tc, the base resin chains and the monomer molecules are linked into a permanent network. Such a network is shown in FIG. 2, in which the base resin 3 is illustrated as being cross-linked through bridges 4 derived from the unsaturated monomer. Because the additive resin is partially compatible with the base resin (but by virtue of it saturation does not take place in the cross-linking reaction), it exerts an automatic swelling pressure on a network containing the latter (FIG. 2) and this swelling pressure resists the characteristic shrinkage on cooling of the cross-linked base resin 3 for which the conventional process (Table I) specific shrinkage control additives are provided. The degree of shrinkage control provided by this invention can be regulated by the amount of monomer forming the bridges 4 between the base resin chains 3 as well as the proportion of additive resin used in the composition. It is recognised that the proportion of additive resin will also be partly determined by the required thickening characteristics of the composition but the invention provides sufficient control parameters to achieve the required shrinkage control as well.

Furthermore, it is possible for the cross-linking reaction to be conducted at lower temperatures than in the case where an unsaturated polyester resin is thickened with a Group II metal oxide or hydroxide.

The additive resin will generally have a minimum average number of units per chain in the range 8 to 20 (to ensure that the thickening network (FIG. 1) is adequately formed) and a maximum average number of units per chain in the range 20 to 40 (to ensure convenient mixing with the base resin after melting at Tm). The invention can however be used with additive resins having an average number of units per chain outside the quoted ranges.

Examples of base resin which may be used are unsaturated polyester resins derived from the condensation products of unsaturated anhydrides or di-acids (e.g. maleic anhydride or fumaric acid) with diols such as ethylene glycol or di-ethylene glycol.

The unsaturated solvent for such resins may be a vinyl monomer, e.g. styrene.

Besides the use of conventional unsaturated polyester-styrene as base resin, the base resin may be an oligomer containing urethane linkages and acrylate groups. It may comprise an oligomer containing ester and urethane groups and having terminal groups of the structure:

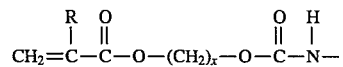

in which R may be H or $CH_3$ and x is an integer less than 10 preferably 1 to 3.

Preferably, the oligomer has a number average molecular weight of 1500–3000. The oligomer may have a 'backbone' derived from a bis-phenol and an alkylene oxide. The backbone may have the following structure.

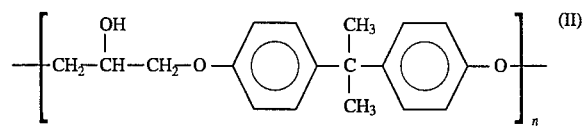

Oligomers of the above type may be dissolved in an unsaturated monomer (e.g. an acrylate such as methyl methacrylate) for use in the composition of the invention. An example base resin of this general type is available from Imperial Chemical Industries under the name MODAR.

The oligomers may be cross-linked using conventional free-radical catalysts.

The use of such urethane acrylate base resins may be expected to provide improvements in chemical resistance, end-use temperature, fire performance and moulding cycle times over that commonly found with compounds based on unsaturated polyester resins. In addition, the lower viscosity of uracrylate compared with unsaturated polyesters may be expected to result in more effective wetting contact with the reinforcing glass fibres in the compounds, and hence give improved mechanical properties. Finally, it must be realised that since uracrylates possess neither terminal nor pendant carboxylic acid residues, they cannot be prethickened by the conventional metal oxide route and are currently excluded from SMC manufacture.

Preferred additive resins for use in conjunction with the above oligomers and unsaturated polyesters include saturated polyesters, for example polyethylene adipate (PEA) and polyhexamethylene adapate (PHMA) with number average molecular weights of 1500–3000, e.g. about 2000. Both are particularly suitable as thickening resins because of their comparative cheapness.

The amount of additive resin (in relation to that of the base resin) used in the composition will depend on the degree of thickening required, the greater the amount of additive resin the greater being the thickening.

A suitable amount of additive resin may for example be 20–40% by weight that of the base resin.

The compositions of the invention may be produced by melting the additive resin and then blending the fused resin with the solution of the base resin in its monomeric solvent, this solution being at a temperature above the melting point (Tm) of the additive resin. The composition thickens on cooling below Tm and obviously any reinforcement for the polymer composition should be incorporated before it cools below Tm to ensure adequate wetting.

The fact that the additive resin is used as a melt for blending with the base resin is obviously advantageous in that the need for a separate dissolution stage for the additive resin is not required. Furthermore since no separate unsaturated solvent is required for the additive resin, the length of the cross-links between the base resin chains (in the final cured product) are not disadvantageously lengthened.

As indicated previously, the compositions of the invention are particularly suitable for the formulation of (i) SMC for which purpose the composition may be admixed with the conventional additive, i.e. fillers, glass fibres etc, and then thickened by heating to produce sheet material which is used in the conventional way; (ii) granular moulding compositions (GMC) for which purpose the composition may be combined with one or more continuous strands of fibre material (e.g. glass) as a pultruded lace and then chopped into short lengths (granules).

The invention has several advantages in SMC as compared with the conventionally used resins. For example, the conventionally used polyester resins must have free-COOH groups for reaction with the Group II metal oxide to effect thickening and these resins must be manufactured consistently. In contrast the use of the additive resin in the invention for effecting thickening means that the presence of free carboxylic groups on the base resin is not required (so that consistent manufacture of the base resin is not so critical) and this opens up the possibility of using base resins with a high hydroxyl number (which may favourably influence the final properties of the moulded article) which is not possible in the case where the resin is to be thickened with a Group II metal. Additionally the thickening reaction is virtually instantaneous in comparison with the two days or so required in the conventional process and, moreover, is reversible.

This reversibility means that should the fibres not be wetted sufficiently by the resin composition, it is only necessary to reheat the composition (to melt some or all of the crystallites) and once again cool it.

The combination of near instaneous thickening and zero shrink in the post cross-linked state is particularly advantageous for the manufacture of granules and their subsequent moulding to shape in a mould. The thickening allows the granules to be cut from pultruded laces in the first place, while the no shrink characteristic of the moulded artefact requires only low pressures and therefore cheap moulds in the subsequent moulding stage.

The invention will be illustrated by reference to the following Examples.

EXAMPLE 1

SMC formulations were prepared using a uracrylate resin (i.e. an oligomer with terminal. groups of formula 1 and backbone of formula II—see above) as base resin and a saturated polyester as additive resin.

The saturated polyester used in this work was a commercial grade of polyethylene adipate, (PEA) of number average molecular weight 2000. Table 2 shows the SMC formulations based on this material.

TABLE 2

| POLYETHYLENE ADIPATE BASED SMC FORMULATIONS | | | |
|---|---|---|---|
| | % By Weight | | |
| Material | (a) | (b) | (c) |
| URACRYLATE RESIN DISSOLVED IN METHYL METHACRYLATE MONOMER | 29.4 | 25.7 | 22.0 |
| HYDROCARB (a commercially available calcium carbonate filler) | 36.4 | 36.4 | 36.4 |
| TRIGONOX (a commercially available peroxy catalyst, namely 1,1-di(tert-butylperoxy-3,3,5-trimethyl cyclohexane) | 0.8 | 0.8 | 0.8 |
| ZINC STEARATE (Mould Release Agent) | 1.1 | 1.1 | 1.1 |
| POLYETHYLENE ADIPATE | 7.3 | 11.0 | 14.7 |
| GLASS MAT | 25.0 | 25.0 | 25.0 |

Since the PEA is a solid at ambient temperature with a melting point of around 50° C., it was first melted and blended with the Uracrylate resin/filler combination, and the resulting mixture spread onto the appropriate quantity of chopped strand glass mat kept at this temperature by means of a hot table. The SMC so prepared was then allowed to cool to ambient temperature between sheets of polythene and cellophane.

PEA was chosen since its solubility parameter of 20 $(MPa)^{1/2}$ is within the prescribed distance from that estimated for the uracrylate (20.7 $(MPa)^{1/2}$).

The results of adding PEA to the uracrylate resin were found to transform a resin with a viscosity of around 1 poise (0.1 Pa s) to a coherent but malleable sheet of perhaps 100000 poise (10 kPa s) at ambient temperature. As expected, over the range of additive proportions applied, the greater the proportion of additive to resin, the stiffer the sheet. In all cases a satisfactory prethickening was obtained. When the PEA was replaced with an additive resin poly-(hexamethylene adipate) PHMA having a somewhat lower solubility parameter, thus increasing the incompatibility with the base resin, then as referred to above, the thickening effect was enhanced or alternatively the same thickening was obtained at lower proportions of additive resin. Generally, it is also found that the tackiness of the thickened sheet decreases at greater degrees of incompatibility (up to the limit prescribed by the invention).

The addition of PEA to the uracrylate resin resists shrinkage during the formation of the cross-linked resin network. This arises because the similarity of the solubility parameters for the PEA and uracrylate ensures that the molten PEA will swell the network at reaction temperatures (of about 140 C). On cooling to room temperature, the network will interfere with any PEA crystallisation, thereby maintaining the swelling pressure, which in turn offsets the shrinkage pressure. Such is found to be the case. In fact with the proportions of Table 2 a small net expansion was found on cooling.

EXAMPLE 2

To further explore the basic concept, PEA and PHMA were added in controlled proportions to a standard unsaturated polyester typically used in SMC manufacture (Table 3). The solubility parameter differences were estimated at 2 and 2.3 respectively that is within the preferred range but greater than that applying to Example 1.

TABLE 3

| Material | % By weight |
| --- | --- |
| Polyester-styrene | 32 |
| Filler (Hydrocarb) | 30 |
| Trigonox | .8 |
| Zinc Stearate | 2.2 |
| PEA or PHMA | 10 |
| Glass Mat | 25 |

The resulting sheets were (a) much stiffer than those in Example 1 (the uracrylate resin) and (b) as expected PHMA was stiffer but less tacky than PEA.

The invention thus provides a new general class of thickenable moulding compositions giving particular advantage in the preparation of sheet moulding compounds (SMC). The invention is not restricted to this class of composition however but applies equally to other processes and compositions requiring a reversible thickening step and/or shrinkage resistance at the moulding stage.

EXAMPLE 3

An SMC formulation was prepared using a uracrylate resin as in Example 1 as base resin and a saturated polyamide vex (PAW) as additive resin with an estimated solubility parameter ($\delta$) of 24 Mpa$^{1/2}$ which, is towards tame edge of the preferred range from that of the base resin ($\delta$=20.7). Table 4 gives the proportions used.

TABLE 4

| Material | % by weight |
| --- | --- |
| URACRYLATE-METHYLMETRACRYLATE | 22 |
| FILLER (HYDROCARB) | 36 |
| TRIGONOX | .8 |
| ZINC STREARATE | 1.2 |
| PAW | 15 |
| GLASS MAT | 25 |

The resulting sheets were generally similar in mechanical behaviour to those formed from the composition listed in column (c) on Table 2 (Example 1) where the quantity of additive resin is much the same. Taking examples 1 and 3 together it can be seen that the invention is effective at both ends of the preferred solubility parameter range ($\Delta\delta$).

We claim:

1. A method of producing a thickened moulding composition comprising a cross-linkable base resin dissolved in an unsaturated monomer which method comprises the steps of:

(1) forming a mixture of the cross-linkable base resin and the unsaturated monomer, (2) heating an additive resin to a temperature (Tm) above its melting point to fuse the additive resin, (3) heating the mixture of the cross-linkable base resin and the unsaturated monomer to a temperature above the melting point (Tm) of the additive resin, to form a hot solution of the base resin in the unsaturated monomer, (4) blending the fused additive resin with the hot solution of the base resin in the unsaturated monomer at a temperature (Tb) above the melting point (Tm) of the additive resin but below the cross-linking temperature (Tc) of the base resin to form a hot blend comprising the base resin, the unsaturated monomer and the additive resin, and (5) cooling the hot blend from the temperature (Tb) to a temperature below the melting point (Tm) of the additive resin to thicken the moulding composition;

which said additive resin (a) is a saturated said additive resin, (b) is an additive resin which by itself is crystalline at ambient temperature and (c) has a melting point (Tm) below the cross-linking temperature (Tc) of the base resin, which said additive resin is, when in the hot blend, (d) in liquid form within the hot blend, (e) distributed throughout the hot blend, and (f) at a temperature above the melting point (Tm) of the additive resin, which said additive has (g) only a partial degree of compatibility with the base resin to be such that on cooling the hot blend from the temperature (Tb) to a temperature below the melting point (Tm) of the additive resin in step (5), the said additive resin forms microcrystalline domains distributed throughout the moulding composition, and which said additive resin (h) thereby thickens the moulding composition at ambient temperature, but (i) is molten at moulding temperatures to provide resistance to moulding shrinkage.

2. A method according to claim 1, wherein the base resin and the additive resin have a solubility parameter difference in the range 0.5 to 3.5 MPa $^{1/2}$.

3. A method according to claim 2, wherein the solubility parameter difference is in the range 1.0 to 2.5 MPa $^{1/2}$.

4. A method according to claim 1, wherein the base resin is an unsaturated polyester resin.

5. A method according to claim 4, wherein the unsaturated monomer is a vinyl monomer.

6. A method according to claim 5, wherein the unsaturated monomer is styrene.

7. A method according to claim 1, wherein the base resin is an oligomer containing urethane linkages and acrylic groups.

8. A method according to claim 7, wherein the oligomer has terminal groups of the formula

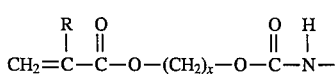

where R is H or CH$_3$ and x is an integer less than 10.

9. A method according to claim 8, wherein x is 1 to 3.

10. A method according to claim 7, wherein the oligomer has a backbone of the structure

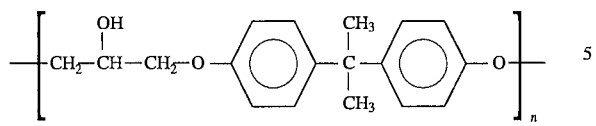

11. A method according to claim 7, wherein the oligomer has a number average molecular weight of 1500 to 3000.

12. A method according to claim 7, wherein the unsaturated monomer is an acrylate or methacrylate.

13. A method according to claim 1, wherein the additive resin has 8 to 40 repeating units.

14. A method according to claim 1, wherein the additive resin is a saturated polyester.

15. A method according to claim 14, wherein the saturated polyester is selected from polyethylene adipate and polyhexamethylene adipate.

16. A method according to claim 1, wherein the additive resin has a number average molecular weight of 1500 to 3000.

17. A method according to claim 16, wherein the additive resin has a number average molecular weight of about 2000.

18. A method according to claim 1, wherein the thickened composition contains from 20 to 40% by weight of the total weight of base resin, unsaturated monomer and additive resin.

19. A method according to claim 1, wherein, in step (4), a free radical catalyst is incorporated in the said hot blend.

20. A method according to claim 1, which includes the additional step of incorporating in the hot blend fibrous reinforcement.

21. A method according to claim 20, in which the thickened moulding composition is in the form of a sheet moulding compound.

22. A method according to claim 20, in which the thickened moulding composition is in the form of a granular moulding compound.

23. A method of producing a moulded article from a thickened moulding composition comprising a cross-linkable base resin dissolved in an unsaturated monomer which method comprises the steps of:

(1) forming a mixture of the cross-linkable base resin and the unsaturated monomer, (2) heating an additive resin to a temperature (Tm) above its melting point to fuse the additive resin, (3) heating the mixture of the cross-linkable base resin and the unsaturated monomer to a temperature above the melting point (Tm) of the additive resin, to form a hot solution of the base resin in the unsaturated monomer, (4) blending the fused additive resin with the hot solution of the base resin in the unsaturated monomer at a temperature (Tb) above the melting point (Tm) of the additive resin but below the cross-linking temperature (Tc) of the base resin to form a hot blend comprising the base resin, the unsaturated monomer and the additive resin, (5) cooling the hot blend from the temperature (Tb) to a temperature below the melting point (Tm) of the additive resin to thicken the composition, (6) introducing the thickened moulding composition into a mould, (7) heating the composition to a temperature above Tm but below Tc so as to break down the thickened composition into a composition able to flow within the mould, (8) further heating the flowable composition to a temperature above Tc to cross-link the base resin, and (9) allowing the composition containing the crosslinked base resin to cool;

which said additive resin (a) is a saturated said additive resin, (b) is an additive resin which by itself is crystalline at ambient temperature and (c) has a melting point (Tm) below the cross-linking temperature (Tc) of the base resin, which said additive resin is, when in the hot blend, (d) in liquid form within the hot blend, (e) distributed throughout the hot blend, and (f) at a temperature above the melting point (Tm) of the additive resin, which said additive has (g) only a partial degree of compatibility with the base resin to be such that on cooling the hot blend from the temperature (Tb) to a temperature below the melting point (Tm) of the additive resin in step (4), the said additive resin forms microcrystalline domains distributed throughout the moulding composition, thereby thickening the said composition, which said additive resin (h) thereby thickens the moulding composition at ambient temperature, but (i) is molten at moulding temperatures to provide resistance to moulding shrinkage.

* * * * *

UNITED STATES PATENT AND TRADEMARK OFFICE
CERTIFICATE OF CORRECTION

PATENT NO.   :   5,516,819

DATED        :   May 14, 1996

INVENTOR(S)  :   Stephen F. Bush, James M. Methven, and David R. Blackburn

It is certified that error appears in the above-identified patent and that said Letters Patent is hereby corrected as shown below:

Title page, under Assignee, please delete "The University of Manchester Institute of Science and Technology, Manchester, England" and substitute --SCOTT BADER COMPANY LIMITED, Northants, United Kingdom--.

Signed and Sealed this

Eighteenth Day of March, 1997

*Attest:*

BRUCE LEHMAN

*Attesting Officer*       Commissioner of Patents and Trademarks